US010428986B2

(12) United States Patent
Yeandel

(10) Patent No.: US 10,428,986 B2
(45) Date of Patent: Oct. 1, 2019

(54) GIMBAL EXPANSION JOINT

(71) Applicant: ROLLS-ROYCE plc, London (GB)

(72) Inventor: Michael Yeandel, Bristol (GB)

(73) Assignee: ROLLS-ROYCE plc, London (GB)

( * ) Notice: Subject to any disclaimer, the term of this patent is extended or adjusted under 35 U.S.C. 154(b) by 188 days.

(21) Appl. No.: 15/642,669

(22) Filed: Jul. 6, 2017

(65) Prior Publication Data

US 2018/0038530 A1 Feb. 8, 2018

(30) Foreign Application Priority Data

Aug. 3, 2016 (GB) ...................................... 1613386

(51) Int. Cl.
*F16L 27/11* (2006.01)
*F16L 27/02* (2006.01)
*F16L 27/10* (2006.01)
*F16L 27/111* (2006.01)
*F16L 51/02* (2006.01)

(52) U.S. Cl.
CPC ............... *F16L 27/11* (2013.01); *F16L 27/02* (2013.01); *F16L 27/1012* (2013.01); *F16L 27/111* (2013.01); *F16L 51/027* (2013.01); *F16L 51/028* (2013.01)

(58) Field of Classification Search
CPC ..... F16L 27/11; F16L 51/027; F16L 27/1012; F16L 27/02; F16L 27/111; F16L 51/028
See application file for complete search history.

(56) References Cited

U.S. PATENT DOCUMENTS

| 311,176 | A | * | 1/1885 | Deimel | ..................... A45C 5/00 190/20 |
| 1,534,399 | A | * | 4/1925 | McClellan | ............. F16L 27/111 285/114 |
| 2,014,355 | A | * | 9/1935 | Hussman | ................ F16L 55/02 285/226 |
| 2,196,676 | A | * | 4/1940 | Johnson | ................ E21B 43/127 220/DIG. 7 |

(Continued)

FOREIGN PATENT DOCUMENTS

| DE | 10119075 A1 * 10/2002 | ........... F04D 29/666 |
| EP | 0852310 A2 * 7/1998 | .......... F01N 13/1811 |

(Continued)

OTHER PUBLICATIONS

Jan. 25, 2017 Search Report issued in Great Britain Patent Application No. 1613386.0.

*Primary Examiner* — James M Hewitt, II
(74) *Attorney, Agent, or Firm* — Oliff PLC

(57) ABSTRACT

A gimbal expansion joint includes a first clevis adapted to be secured to one end of a first piece of ducting, a second clevis adapted to be secured to an end of a second piece of ducting, and a gimbal arrangement to which the first and second clevises are pivotably connected to form a universal joint between the ends of the pieces of ducting. A flexible duct extends between the first and second clevises to form a passage for fluid communication between the ends of the first and second pieces of ducting. The flexible duct has a respective flange at each end, each flange providing an axially-directed face across which a clamping load is applied to affix the flange to a corresponding axially-directed face of the respective clevis.

17 Claims, 4 Drawing Sheets

(56) References Cited

U.S. PATENT DOCUMENTS

| | | | |
|---|---|---|---|
| 3,232,646 A * | 2/1966 | Stark | F16L 27/0857 |
| | | | 285/226 |
| 4,059,293 A * | 11/1977 | Sipler | F16L 27/11 |
| | | | 285/179 |
| 4,645,244 A | 2/1987 | Curtis | |
| 5,112,088 A | 5/1992 | Moore et al. | |
| 5,340,165 A * | 8/1994 | Sheppard | F01N 13/1811 |
| | | | 285/226 |
| 2004/0245770 A1 | 12/2004 | Christianson et al. | |
| 2017/0167649 A1* | 6/2017 | Tabb | B64G 1/00 |

FOREIGN PATENT DOCUMENTS

| | | | | |
|---|---|---|---|---|
| EP | 1006306 A1 * | 6/2000 | | F01N 13/1811 |
| EP | 2587108 A2 * | 5/2013 | | F16L 25/0036 |
| GB | 627120 A | 7/1949 | | |

* cited by examiner

GIMBAL EXPANSION JOINT

FIELD OF THE INVENTION

The present invention relates to gimbal expansion joints for use in joining ducting.

BACKGROUND

Gimbal expansion joints (also commonly referred to as 'gimbals') are typically found in ducting where it is beneficial to allow relative movement between portions of the ducting. In particular, gimbal expansion joints allow rigid sections of ducting to angulate relative to one another. In, for example, a gas turbine engine bleed system, this may allow accommodation of thermal displacements and relative displacement due to airframe and engine loads. Such accommodation can reduce the stresses experienced by the system, and may also reduce the loads transferred to the airframe and engine interfaces.

A conventional gimbal expansion joint described in U.S. Pat. No. 3,232,646 is shown in FIG. 1. Two pieces of pipe ducting are interconnected by a flexible coupling which comprises two clevis-type end parts 101 and 103 connected together by an annular gimbal ring 105, having two pairs or sets of pivot members 107a, b. The members of each pair are in a diametrically opposed relationship, each pair having its pivotal axis disposed at right angles to the pivotal axis of the other pair and being pivotably connected to a respective one of the end parts 101, 103. In this way, the end parts and gimbal ring can act as a universal joint. To prevent fluid passing through the ducting leaking out of the coupling, a flexible bellows 109 is arranged externally around the gimbal ring 105, opposite ends of the bellows 109 being welded to the end parts in a fluid tight manner.

FIG. 2 shows a schematic half longitudinal cross-section through a further conventional gimbal expansion joint located on axis Y-Y. This gimbal expansion joint also has a first clevis 125 for securing to one end of a first piece of ducting, a second clevis 127 for securing to an end of a second piece of ducting, and a gimbal ring 131 to which the first and second clevises are pivotably connected at respective orthogonally disposed pairs of pivots to form a universal joint between the ends of the pieces of ducting. Each pivot in this joint, however, is formed by a pin 133 which projects outwardly from the gimbal ring to pass through a hole in the respective clevis so that the clevis can rotate about the pin. The joint has a flexible bellows 129 welded to both the clevises such that, in use, the first and second pieces of ducting are fluidly connected, but in this joint the bellows is arranged internally of the gimbal ring.

As shown in both FIG. 1 and FIG. 2, in conventional gimbal expansion joints, each weld interface between the bellows and one of the clevises is formed across curved, radially-directed faces of the bellows and the clevis. Due to tolerances on curvature, these faces may not be perfectly matched. However, by welding the interface, leakage paths between the bellows and clevises can be prevented from forming.

Other approaches for joining the curved interfaces, such as use of adhesives and fillers, are also possible, but when operating temperatures are in excesses of 150° C. (as is typically the case in the context of gas turbine engine bleed systems), welding is generally used because at such temperatures, adhesives and fillers may melt or otherwise degrade. However, welding of dissimilar materials is more problematic than welding of similar or identical materials. Accordingly, the material of the bellows and the clevises are typically selected to be formed of the same material, to facilitate their welding together. Each clevis and associated ducting may also be welded together and thus formed of the same material for the same reason.

However, this can have the effect that the material of the ducting, which is typically over 95% of the total weight of a ducting assembly including the gimbal expansion joint, may be defined by a requirement for the bellows material, which is typically under 1% of the weight of the assembly.

For example, ducting operating at relatively low temperatures (~150° C.) that could be made from, e.g. a lightweight titanium alloy, may instead be manufactured from heavier Inconel™, solely because the bellows needs to be manufactured from Inconel™ to achieve satisfactory strength to accommodate the required flexing of the bellows.

SUMMARY

The present invention aims to address the above problems.

Thus, in a first aspect, the present invention provides a gimbal expansion joint for use in joining ducting, the gimbal expansion joint having:
  a first clevis adapted to be secured to one end of a first piece of ducting, a second clevis adapted to be secured to an end of a second piece of ducting, and a gimbal arrangement to which the first and second clevises are pivotably connected to form a universal joint between the ends of the pieces of ducting; and
  a flexible duct extending between the first and second clevises to form a passage for fluid communication between the ends of the first and second pieces of ducting;
  wherein the flexible duct has a respective flange at each end, each flange providing an axially-directed face across which a clamping load is applied to affix the flange to a corresponding axially-directed face of the respective clevis.

By providing a configuration in which the clamping load is applied across axially-directed faces of the flange and respective clevis, it is possible to provide a gimbal expansion joint with a suitably fluid-tight seal at the gimbal expansion joint, without welding of the flexible duct and the clevises. As welding is not necessary, this avoids materials selection limitations imposed on conventional gimbal expansion joints caused by problems associated with the welding together of dissimilar materials. The increased flexibility in materials selection can allow e.g. for weight savings as each component in a ducting assembly incorporating the invention can be formed from a material selected based on that component's requirements, rather than requirements of other components connected by welding.

In a second aspect, the present invention provides a ducting assembly having first and second pieces of ducting joined by the gimbal expansion joint of the first aspect. For example, such a ducting assembly may be a ducting assembly of a gas turbine engine air bleed system, although it may also find use in any application where fluid is transferred through ducting between locations that have relative movement between them.

In a third aspect, the present invention provides a gas turbine engine air bleed system having the ducting assembly of the second aspect.

In a fourth aspect, the present invention provides a gas turbine engine having the air bleed system of the third aspect.

Optional features of the invention will now be set out. These are applicable singly or in any combination with any aspect of the invention.

The flexible duct may be formed of a material that is different to that of the first and second clevises. Whilst the materials of the flexible duct and the clevises are not particularly limited, the bellows may be formed of, e.g. a superalloy, and the first and second clevises may be formed of, e.g. a titanium alloy. An example of a particularly suitable superalloy which the flexible duct may be formed from is an austenitic nickel-chromium-based superalloy such as Inconel™. Such materials selection can reduce the weight of ducting assemblies which incorporate the gimbal expansion joint of the present invention, as it is not necessary to limit the material of the ducting to that required for the flexible duct.

The first and second clevises may be adapted to be secured to the first and second pieces of ducting by welding or brazing. Accordingly, the first and second clevises may be formed of the same material as the first and second pieces of ducting.

The form of the flexible duct is not particularly limited, as long as it is able to achieve a suitable amount of flexibility to accommodate a desired range of movement in use. However, the flexible duct may conveniently be configured as a bellows. Conveniently, the flanges at each end of the flexible duct are integrally formed with the flexible duct. Integrally-formed flanges may help to prevent additional leakage paths from forming, and reduce the need for additional process steps in construction of the joint.

The axially-directed faces of the flanges and the clevises may be planar. This can assist in forming a fluid-tight joint between each flange and the clevis to which it is affixed. The axially-directed faces are typically annular.

The gimbal expansion joint may further have a respective load spreading member(s) at each end of the flexible duct. The flanges, being part of the flexible duct, may be relatively compliant, and thus the load spreading member(s) can help to ensure adequate fluid-tightness around each flange where it is affixed to the respective clevis. The load spreading member(s) may circumferentially distribute the clamping load around the respective flange. The form of the load spreading member(s) is not particularly limited. It may be, for example, an annular plate, or there may be a plurality of spaced load spreading members at each end of the flexible duct. Conveniently, each load spreading member may be formed of two or more separate parts. This may help simplify assembly of the joint.

The clamping loads may be applied by a variety of means. Conveniently, the clamping loads may be applied by mechanical fasteners (e.g. bolts, rivets, or any other suitable fastener). However, other arrangements are possible. For example, the clamping loads may be applied by interference fitting the outside of a load spreading member into a clevis. In particular, such an interference fit may be achieved by interference fitting the outside of a load spreading member against a raised annular spigot formed in the clevis. Such a load spreading member may be a unitary part. Alternatively, when such a load spreading member is formed of two or more separate parts, these can be joined together during assembly of the gimbal expansion joint.

Where the clamping load is applied by mechanical fasteners, there may be one fastener at each flange/clevis interface, or there may be a plurality of fasteners. Conveniently, the clamping load may be applied by a respective circumferential row of mechanical fasteners. Preferably, where there is a circumferential row of mechanical fasteners, the fasteners are equally spaced. This may help to evenly distribute the clamping force applied at the respective flange.

The flexible duct may be radially inwards of the gimbal arrangement. In this way the gimbal arrangement can avoid being directly exposed to fluid flowing through the ducting, which fluid may be at relatively high temperature.

The gimbal expansion joint may further have respective guidance nozzles extending from the clevises into the flexible duct. The guidance nozzles can direct fluid flowing through the ducting away from the inner surface of the flexible duct. Particularly when the flexible duct is a bellows, this can help to reduce fluid pressure losses caused by turbulence-inducing corrugations of the bellows.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
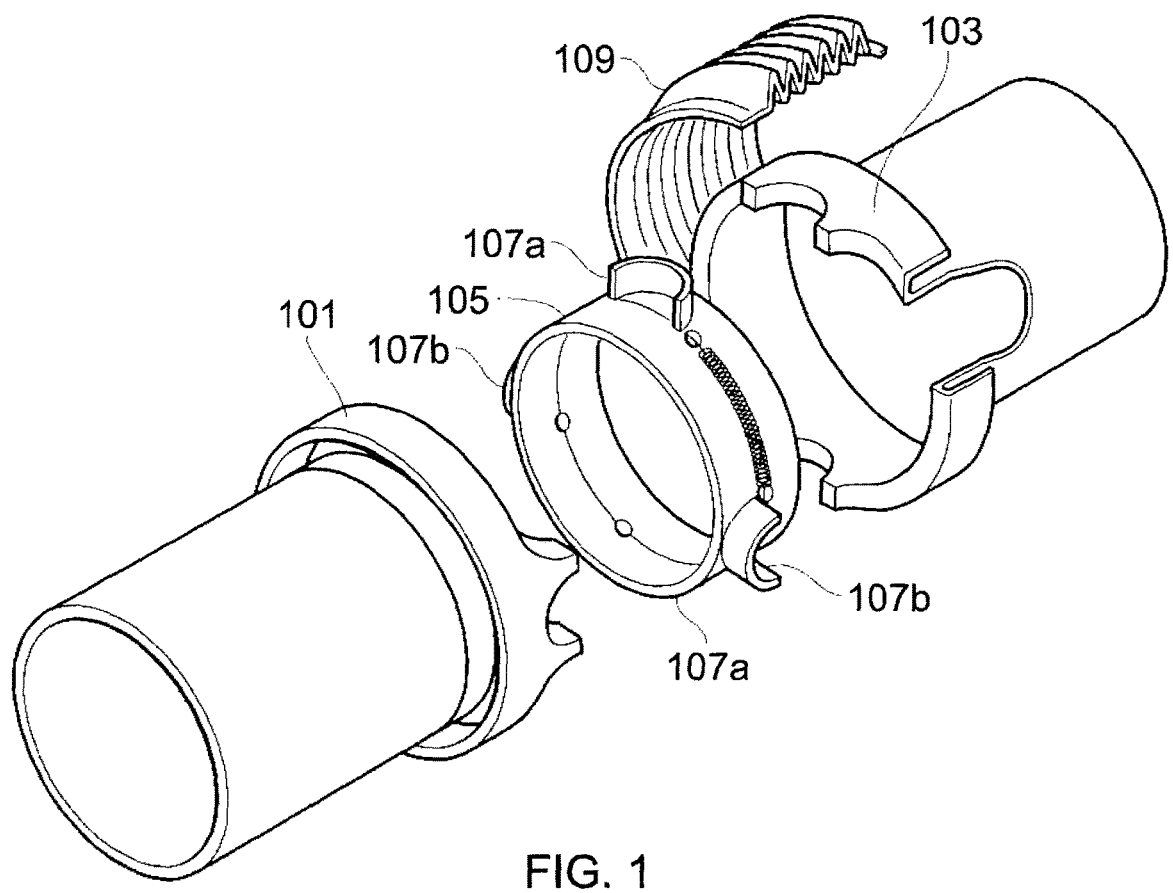
FIG. 1 shows an exploded perspective view of a conventional gimbal expansion joint.
Figure 2:
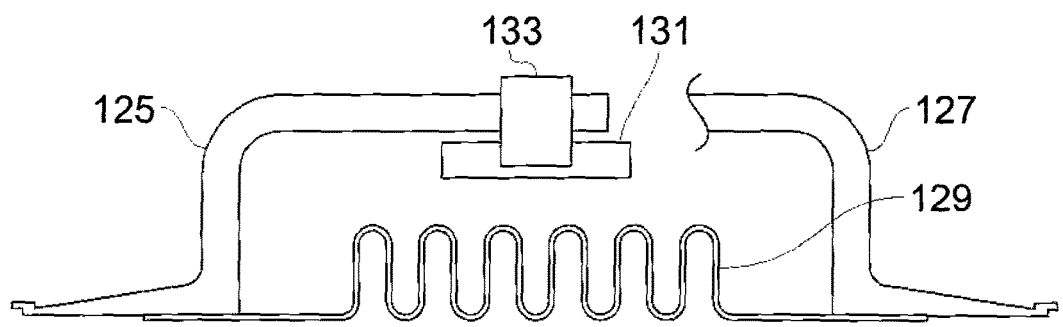
FIG. 2 shows a schematic half longitudinal cross-section of a further conventional gimbal expansion joint.
Figure 3:
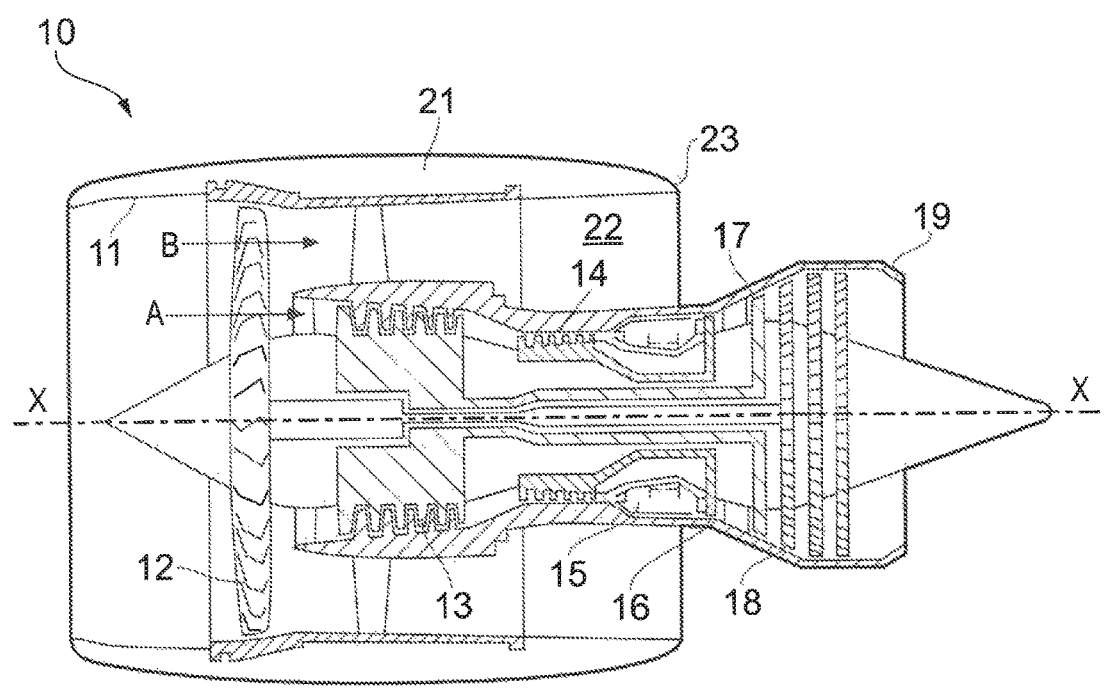
FIG. 3 shows a longitudinal cross-section through a ducted fan gas turbine engine.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The gas turbine engine includes one or more bleed systems, which include respective ducting assemblies. Compressor bleed systems are used, for example, to improve engine handling and to provide aircraft services such as cabin pressurisation and airframe de-icing. One or more of the ducting assemblies include respective gimbal expansion joints, which can help to accommodate thermal displacements and mechanical displacements due to airframe and engine loads. Such accommodation can reduce the stresses experienced by the ducting assemblies, and may also reduce the loads transferred to the airframe and engine interfaces.

Figure 4A:
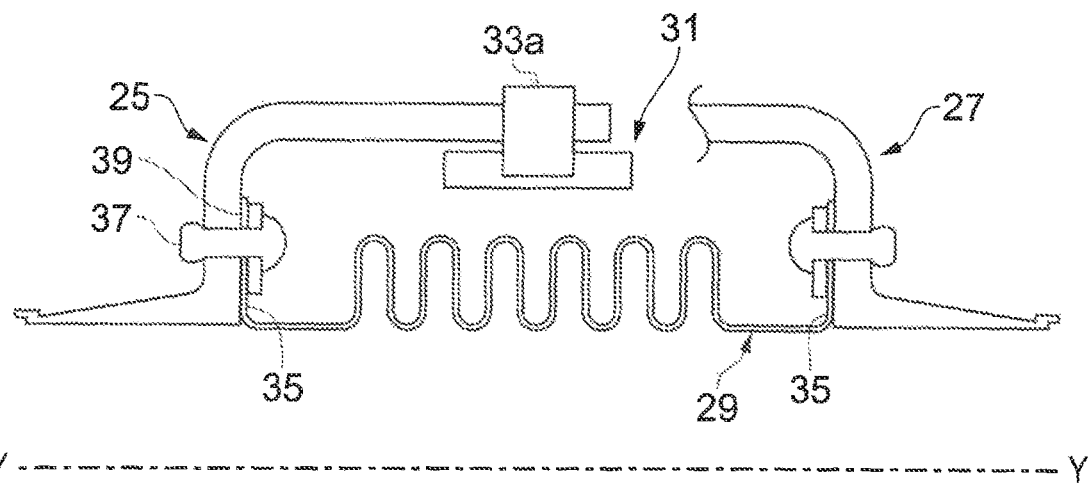
FIG. 4A shows a schematic half longitudinal cross-section of a first variant of a gimbal expansion joint wherein a clamping load is applied by mechanical fasteners.
Figure 4B:
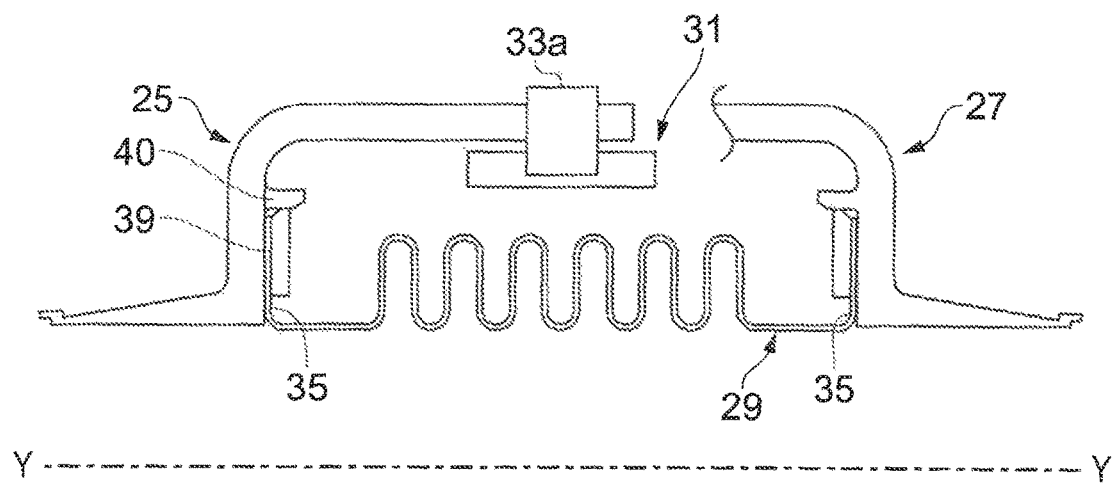
FIG. 4B shows a schematic half longitudinal cross-section of a second variant of a gimbal expansion joint wherein a clamping load is applied by interference fitting of load spreading members into respective clevises.
Figure 5:
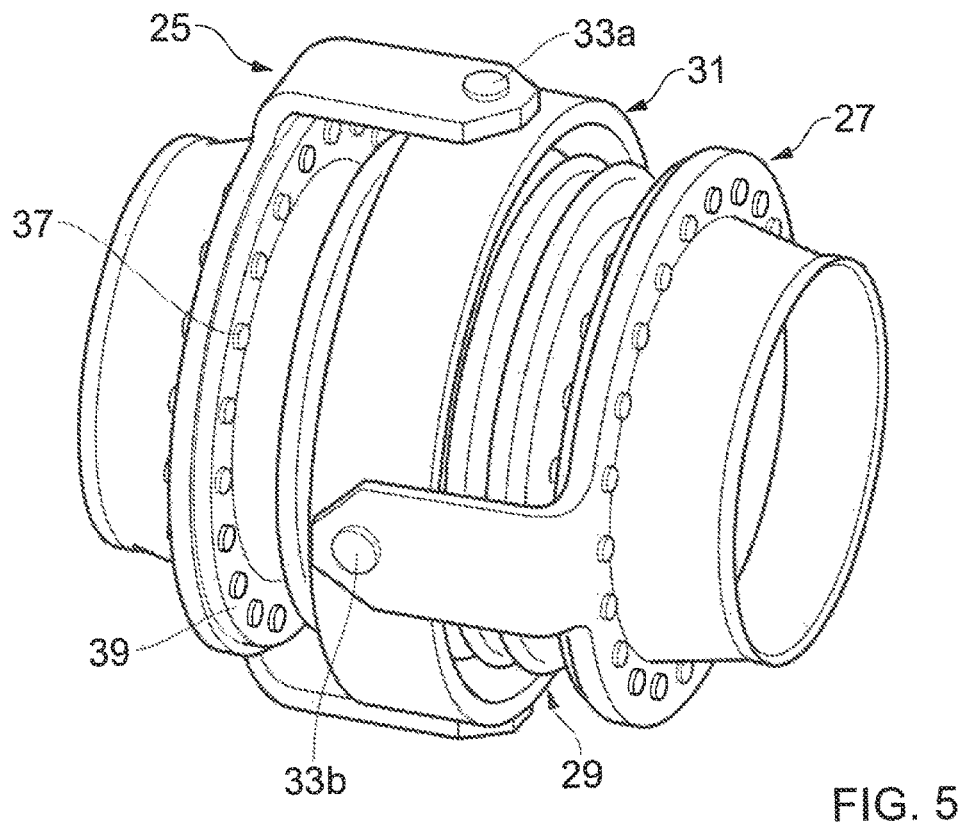
FIG. 5 shows a perspective view of the gimbal expansion joint of FIG. 4A.
Figure 6:
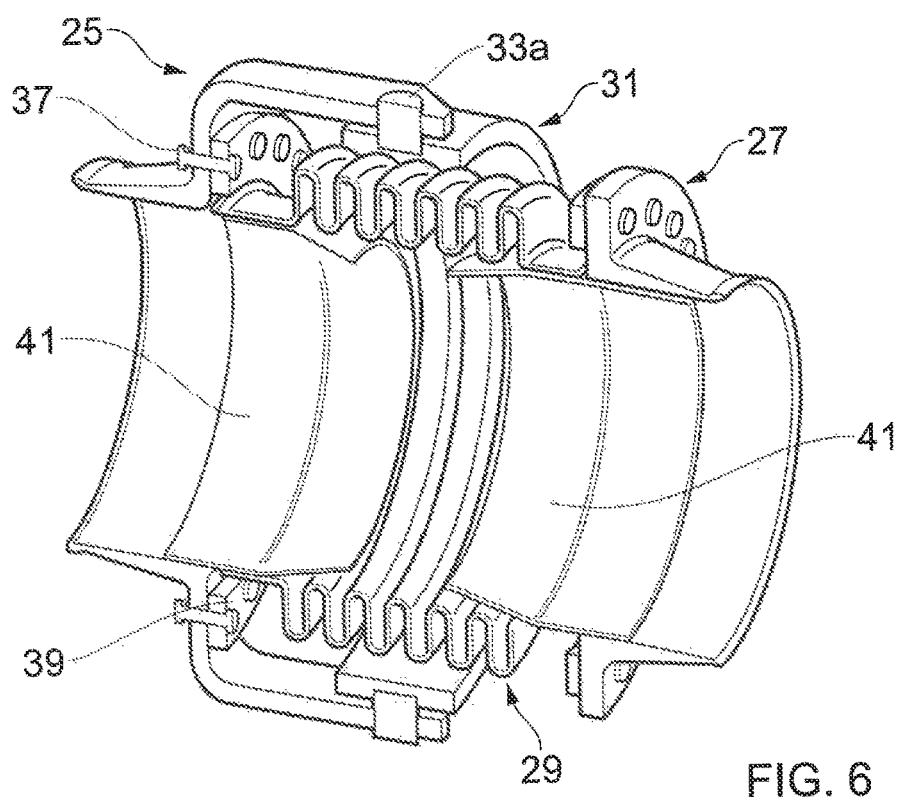
FIG. 6 shows a perspective longitudinal cross-section through the gimbal expansion joint of FIGS. 4A and 5.

FIG. 4A and FIG. 4B show schematic half longitudinal cross-sections of two variants of such a gimbal expansion joint located on axis Y-Y. In the first variant shown in FIG. 4A a clamping load is applied by one or more mechanical fasteners; in the second variant shown in FIG. 4B a clamping load is applied by interference fitting of load spreading members into respective clevises. FIG. 5 shows a perspective view of the joint of FIG. 4A, and FIG. 6 shows a perspective longitudinal cross-section through the joint of FIGS. 4A and 5. The joint has a first clevis 25, adapted to be welded to one end of a first piece of ducting (not shown), and a second clevis 27 adapted to be welded to an end of a second piece of ducting (not shown). A flexible duct 29 in the form of a bellows extends between the first and second clevises to form a passage for fluid communication between the ends of the first and second pieces of ducting. Between the first and second clevises is a gimbal ring 31 to which the first and second devises are pivotably connected at pivot points 33a, b to form a universal joint between the ends of the pieces of ducting. More particularly, the gimbal ring has two, orthogonally disposed, pairs of pivot points, where each clevis is attached to a respective one of the pairs. The pivot points of each pair are diametrically opposed across the gimbal ring. Each pivot point is formed by a respective pin which projects radially outwardly from the gimbal ring to pass through a hole in the respective clevis.

As best shown in FIG. 6, a pair of flow guidance nozzles 41 may extend from the clevises into the bellows 29. The nozzles help to smooth the passage of the air flow carried by the ducting through the bellows by directing the air flow away from the turbulence-inducing corrugations of the bellows, and thus helping to reduce pressure losses within the gimbal expansion joint.

As shown in FIG. 4A and FIG. 4B, the bellows 29 has a respective flange 35 at each end, each flange providing an annular and planar axially-directed face across which a clamping load is applied to affix the flange to a corresponding annular and planar axially-directed face of the respective clevis 25, 27. The flanges are integrally formed with the bellows, e.g. by a similar process to that used to create corrugations in the bellows. In the variant of FIG. 4A, the clamp load at each end is conveniently applied using a circumferential row of mechanical fasteners 37 and, optionally, a load spreading plate 39 which helps to apply the load more uniformly around the relatively compliant flange. In this way the load spreading plate can improve fluid-tightness of the joint between the flange and the clevis. The mechanical fasteners are conveniently nuts and bolts or rivets. The load spreading plate in this variant can be formed from two separate semi-circular parts, which can simplify assembly of the joint. In the variant of FIG. 4B, each clamp load is applied by interference fitting a respective load spreading plate against an annular spigot 40 formed in each clevis. This variant can eliminate the need for processing steps to form holes for mechanical fasteners. However, regardless of the exact method of application of a clamping force between the bellows and respective clevises, as the interface between a given flange and its clevis is not formed between curved, radially-directed faces, but rather is formed across two co-planar, axially-directed faces, it is possible to form sufficiently fluid-tight seals between the bellows and the clevises without resorting to welding.

As the bellows and clevises are not welded together they may be formed from different materials. Thus the bellows may be formed of e.g. Inconel™ to satisfy the strength requirements of the bellows, whilst the clevises (and indeed, any ducting which the clevises are connected to) may be formed of e.g. a titanium alloy to provide a weight saving.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A gimbal expansion joint for use in joining ducting, the gimbal expansion joint having:
    a first clevis adapted to be secured to one end of a first piece of ducting, a second clevis adapted to be secured to an end of a second piece of ducting, and a gimbal arrangement to which the first and second clevises are pivotably connected to form a universal joint between the ends of the pieces of ducting; and
    a flexible duct extending between the first and second clevises to form a passage for fluid communication between the ends of the first and second pieces of ducting;
    wherein the flexible duct has a respective flange at each end, each flange providing an axially-directed face across which a clamping load is applied to affix the flange to a corresponding axially-directed face of the respective clevis, and
    the axially-directed face of each of the first and second clevises is an inward-facing surface that faces, in an axial direction, toward the gimbal arrangement, and the clamping load presses the respective flange against the respective inward-facing surface.

2. The gimbal expansion joint according to claim 1 wherein the flexible duct is a bellows.

3. The gimbal expansion joint according to claim 1 wherein the axially-directed faces are planar.

4. The gimbal expansion joint according to claim 1 wherein the axially-directed faces are annular.

5. The gimbal expansion joint according to claim 1 further having a respective load spreading member(s) at each end of the flexible duct, the load spreading member(s) distributing the clamping load around the respective flange.

6. The gimbal expansion joint according to claim 1 wherein the clamping loads are applied by mechanical fasteners.

7. The gimbal expansion joint according to claim 6 wherein each clamping load is applied by a respective circumferential row of mechanical fasteners.

8. The gimbal expansion joint according to claim 1 wherein the flexible duct is formed of a material different to that of the first and second clevis.

9. The gimbal expansion joint according to claim 1 wherein each of the first and second clevises is formed of the same material as that of the ducting to which it is secured.

10. The gimbal expansion joint according to claim 1 wherein the clevises are secured to the respective pieces of ducting by welding or brazing.

11. The gimbal expansion joint according to claim 1 wherein the flexible duct is formed of a superalloy, and the first and second clevises are formed of a titanium alloy.

12. The gimbal expansion joint according to claim 1 wherein the flanges are integrally formed with the flexible duct.

13. A ducting assembly having first and second pieces of ducting joined by the gimbal expansion joint according to claim 1.

14. A gas turbine engine air bleed system having the ducting assembly of claim 13.

15. A gas turbine engine having the air bleed system of claim 14.

16. A gimbal expansion joint for use in joining ducting, the gimbal expansion joint having:
- a first clevis adapted to be secured to one end of a first piece of ducting, a second clevis adapted to be secured to an end of a second piece of ducting, and a gimbal arrangement to which the first and second clevises are pivotably connected to form a universal joint between the ends of the pieces of ducting; and
- a flexible duct extending between the first and second clevises to form a passage for fluid communication between the ends of the first and second pieces of ducting;

wherein the flexible duct has a respective flange at each end, each flange providing an axially-directed face across which a clamping load is applied to affix the flange to a corresponding axially-directed face of the respective clevis, and wherein each clamping load is applied by a respective circumferential row of mechanical fasteners, each mechanical fastener passing through one of the respective flanges of the flexible duct.

17. A gimbal expansion joint for use in joining ducting, the gimbal expansion joint having:
- a first clevis adapted to be secured to one end of a first piece of ducting, a second clevis adapted to be secured to an end of a second piece of ducting, and a gimbal arrangement to which the first and second clevises are pivotably connected to form a universal joint between the ends of the pieces of ducting; and
- a flexible duct extending between the first and second clevises to form a passage for fluid communication between the ends of the first and second pieces of ducting;

wherein the flexible duct has a respective flange at each end, each flange providing an axially-directed face across which a clamping load is applied to affix the flange to a corresponding axially-directed face of the respective clevis, the clamping load being applied by a load spreading member engaged by interference fit with the respective clevis.

\* \* \* \* \*